US010443637B2

(12) United States Patent
Pinney

(10) Patent No.: US 10,443,637 B2
(45) Date of Patent: Oct. 15, 2019

(54) FASTENER SYSTEM FOR A THERMAL PROTECTION SYSTEM

(71) Applicant: The Boeing Company, Chicago, IL (US)

(72) Inventor: Thomas Richardson Pinney, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 147 days.

(21) Appl. No.: 15/702,425

(22) Filed: Sep. 12, 2017

(65) Prior Publication Data
US 2019/0078599 A1 Mar. 14, 2019

(51) Int. Cl.
| | | |
|---|---|---|
| *B64G 1/58* | (2006.01) | |
| *F16B 5/02* | (2006.01) | |
| *F16B 33/00* | (2006.01) | |
| *F02K 1/82* | (2006.01) | |
| *F02C 7/24* | (2006.01) | |
| *F16B 35/06* | (2006.01) | |

(52) U.S. Cl.
CPC .................. *F16B 5/02* (2013.01); *B64G 1/58* (2013.01); *F02C 7/24* (2013.01); *F02K 1/822* (2013.01); *F16B 5/0241* (2013.01); *F16B 33/006* (2013.01); *F16B 35/06* (2013.01); *F05D 2260/231* (2013.01); *Y10T 428/233* (2015.01); *Y10T 428/24008* (2015.01); *Y10T 428/24322* (2015.01); *Y10T 428/249923* (2015.04)

(58) Field of Classification Search
CPC ......... Y10T 428/233; Y10T 428/24322; Y10T 428/24008; Y10T 428/249923; B64G 1/58; F16B 5/0241; F16B 33/006; F16B 43/02; F02C 7/24
See application file for complete search history.

(56) References Cited

U.S. PATENT DOCUMENTS

| | | | |
|---|---|---|---|
| 5,405,227 A * | 4/1995 | His ....................... | C04B 35/806 411/366.3 |
| 8,752,350 B2 | 6/2014 | Pinney et al. | |
| 9,248,923 B2 | 2/2016 | Pinney et al. | |
| 2003/0131982 A1* | 7/2003 | Riedell ..................... | B64C 1/38 165/185 |

OTHER PUBLICATIONS

"PB20 Plain Spherical Lubricated Ball Bushing Bearing ID20×OD46×W25mm IKO/Japan," BearingsDirect, 2 pages. Retrieved Sep. 11, 2017, from https://bearingsdirect.com/com-m-metric-plain-spherical-bearing-chrome-steel/2419-pb20-plain-spherical-lubricated-ball-bushing-bearing-id20-x-od46-x-w25mm-iko-japan.html.
Rodman Media, 1 page. Retrieved Sep. 11, 2017, from http://dev.rodpub.com/images/113/119_main.jpg.

\* cited by examiner

*Primary Examiner* — Alexander S Thomas
(74) *Attorney, Agent, or Firm* — Yee & Associates, P.C.

(57) ABSTRACT

A thermal protection system comprises a ceramic panel, a plurality of apertures, and a fastener system within each of the plurality of apertures. The ceramic panel has a plurality of attachment points to a structure. The plurality of apertures extends through the ceramic panel, each aperture of the plurality of apertures located at an attachment point of the plurality of attachment points. Each fastener system comprises a fastener having a head with a spherical underside and a ceramic bushing with a mating surface configured to mate with the spherical underside of the head of the fastener.

22 Claims, 9 Drawing Sheets

FASTENER SYSTEM FOR A THERMAL PROTECTION SYSTEM

BACKGROUND INFORMATION

1. Field

The present disclosure relates generally to aerospace vehicles and, in particular, to a method and apparatus for attaching thermal protection systems to an aerospace vehicle.

2. Background

Aircraft engines generate high exhaust temperatures during operation. A thermal protection system covers portions of external aircraft structures to protect the structures from elevated temperatures.

It is desirable to have a thermal protection system that requires little or no maintenance. Some components used by a thermal protection system may include modular components that may be removed and replaced. For example, tiles are examples of components that may be used in a thermal protection system. A tile is a thermal protection system component that may be fabricated from ceramic and/or ceramic matrix composite materials. More specifically, a tile may have, for example, a ceramic substrate with a ceramic matrix composite layer wrapped around the core. In the event that a tile may need to be replaced, it is desirable to minimize the amount of time needed to replace tiles on an aircraft.

Thermal protection systems on existing aircraft may be adhesively bonded or mechanically attached. With bonded thermal protection systems, the amount of time and cost associated with installation, inspection, and/or repair may be much greater than compared to a mechanically attached system. Further, bonded thermal protection systems are not necessarily removable without destroying a portion of the part. As a result, inspection of an aircraft substructure and/or internal aircraft subsystems may be more time consuming or expensive than desired.

Another drawback of bonded thermal protection systems is the temperature limitations of the adhesive bond lines. Conventional adhesives for thermal protection systems do not provide structural adhesion over about 550 degrees Fahrenheit.

One challenge of making a mechanically attached thermal protection system is the management of thermal growth. During use of thermal protection systems, the thermal protection system material heats up and grows. The thermal growth puts stress at attachment locations. The hot-side surface of the thermal protection system will grow more than the underside, causing a tile, or panel, of the thermal protection system to try to bow outward. Thermal growth may result in inconsistencies at the attachment points.

Therefore, it would be desirable to have a method and apparatus that takes into account at least some of the issues discussed above, as well as other possible issues. For example, it would be desirable to have a method and apparatus that allows for at least one of reduced installation time or improved maintenance time for thermal protection systems. As another example, it would be desirable to have a method and apparatus that reduces stress at attachment locations of a mechanically attached thermal protection system.

SUMMARY

An illustrative embodiment of the present disclosure provides fastener system for a thermal protection system. The fastener system comprises a fastener and a ceramic bushing. The fastener has a head with a spherical underside. The ceramic bushing has a mating surface configured to mate with the spherical underside of the head of the fastener.

Another illustrative embodiment of the present disclosure provides a thermal protection system comprises a ceramic panel, a plurality of apertures, and a fastener system within each of the plurality of apertures. The ceramic panel has a plurality of attachment points to a structure. The plurality of apertures extends through the ceramic panel, each aperture of the plurality of apertures located at an attachment point of the plurality of attachment points. Each fastener system comprises a fastener having a head with a spherical underside and a ceramic bushing with a mating surface configured to mate with the spherical underside of the head of the fastener.

A further illustrative embodiment of the present disclosure provides a method. An aperture extending through a ceramic panel of a thermal protection system is formed. A ceramic bushing with a mating surface is inserted into the aperture. A fastener having a head with a spherical underside is inserted into the aperture such that the spherical underside of the head of the fastener mates with the mating surface of the ceramic bushing.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that restraining thermal growth of a ceramic panel puts significant stresses into the thermal protection system (TPS). The illustrative embodiments recognize and take into account that allowing for thermal growth of the ceramic panel will allow the thermal protection system to bow slightly, relieving thermally induced stresses. The illustrative embodiments recognize and take into account that mechanical attachment systems will desirably allow the thermal protection system to bow slightly to reduce the thermally induced stresses.

The illustrative embodiments recognize and take into account that systems have been designed to mechanically attach thermal protection system (TPS) to a structure using fasteners on the side of the thermal protection system (TPS) tiles and using flexible metal members to allow for thermal growth. The illustrative embodiments recognize and take into account that previously designed systems use additional sealing members that increases the complexity of the system, especially in an airbreathing exhaust environment.

The illustrative embodiments recognize and take into account that other types of vehicles or platforms also benefit from thermal protection systems. For example, spacecraft also benefit from thermal protection systems. A spacecraft is a type of vehicle or device designed for space flight. The illustrative embodiments recognize and take into account that when a spacecraft returns to earth, the spacecraft may encounter high temperatures on reentry. A thermal protection system may cover some or essentially all of a spacecraft. A thermal protection system may protect the spacecraft from temperatures that may reach around 1650 degrees Celsius during atmospheric reentry. Further, this thermal protection system also may be used to protect the spacecraft from heat and cold in space while in orbit.

Figure 1:
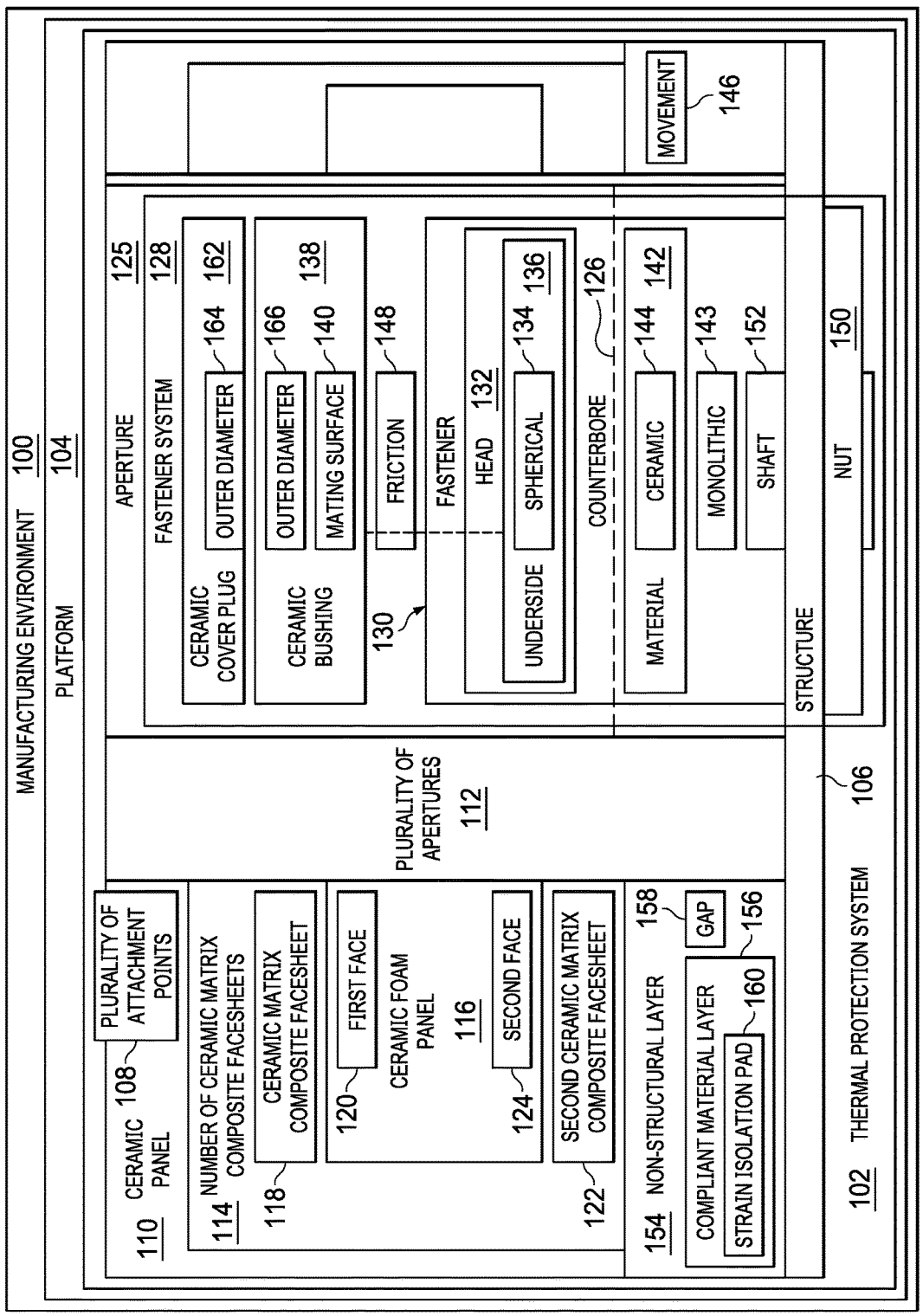
FIG. 1 is an illustration of a block diagram of a manufacturing environment in accordance with an illustrative embodiment.

Referring now to the figures, and in particular, with reference to FIG. 1, an illustration of a block diagram of a manufacturing environment is depicted in accordance with an illustrative embodiment. Manufacturing environment 100 is an environment in which thermal protection system 102 is connected to platform 104. Platform 104 takes any desirable form.

For example, platform 104 may be any one of a mobile platform, a stationary platform, a land-based structure, an aquatic-based structure, and a space-based structure. More specifically, platform 104 may be one of an aircraft, a spacecraft, a building, a satellite, a manufacturing facility, a power plant, or any other desirable type of platform exposed to extreme temperatures.

Thermal protection system 102 is connected to structure 106 of platform 104 at plurality of attachment points 108. Thermal protection system 102 comprises ceramic panel 110, plurality of apertures 112, and a fastener system within each of the plurality of apertures.

Ceramic panel 110 has plurality of attachment points 108 to structure 106. Plurality of apertures 112 extend through ceramic panel 110. Each aperture of plurality of apertures 112 is located at an attachment point of plurality of attachment points 108.

Ceramic panel 110 takes any desirable form. As depicted, ceramic panel 110 comprises number of ceramic matrix composite facesheets 114 and ceramic foam panel 116. Ceramic foam panel 116 may also be referred to as a ceramic foam tile. Ceramic foam panel 116 may be formed of any desirable ceramic foam selected for heat resistant and insulative properties. Number of ceramic matrix composite facesheets 114 may be formed of any desirable ceramic matrix composite. In some illustrative examples, Number of ceramic matrix composite facesheets 114 are made of Nextel™ 720/Aluminosilicate [N720/AS].

Number of ceramic matrix composite facesheets 114 includes any desirable quantity of ceramic matrix composite facesheets. As used herein, "a number of" items is one or more items. For example, number of ceramic matrix composite facesheets 114 is one or more ceramic matrix composite facesheets.

Number of ceramic matrix composite facesheets 114 comprises ceramic matrix composite facesheet 118 contacting first face 120 of ceramic foam panel 116. In some illustrative examples, number of ceramic matrix composite facesheets 114 further comprises second ceramic matrix composite facesheet 122 contacting second face 124 of ceramic foam panel 116, wherein second face 124 is opposite first face 120.

In some other illustrative examples, number of ceramic matrix composite facesheets 114 comprises ceramic matrix composite facesheet 118 wrapped around ceramic foam panel 116. In these illustrative examples, ceramic matrix composite facesheet 118 contacts both first face 120 and second face 124. In these illustrative examples, second ceramic matrix composite facesheet 122 is not present.

Plurality of apertures 112 includes any desirable quantity of apertures. A quantity of apertures in plurality of apertures 112 may be selected based on any desirable operational, manufacturing, or other characteristics of platform 104.

Aperture 125 is depicted for illustrative purposes. The remaining apertures of plurality of apertures 112 are not depicted only for ease of illustration. Aperture 125 is representative of each of plurality of apertures 112.

In thermal protection system 102, each aperture of plurality of apertures 112 comprises a counterbore. For illustrative purposes, aperture 125 has counterbore 126. In some illustrative examples, each counterbore extends through ceramic foam panel 116. In some illustrative examples, each counterbore extends through only a portion of ceramic foam panel 116. In each illustrative example, each ceramic bushing is within a respective counterbore.

Thermal protection system 102 comprises a fastener system within each of plurality of apertures 112. As depicted, fastener system 128 is within aperture 125. Fastener system 128 is depicted for illustrative purposes. The remaining fastener systems within plurality of apertures 112 are not depicted only for ease of illustration. Fastener system 128 is representative of each fastener system within plurality of apertures 112.

Each fastener system comprises a fastener having a head with a spherical underside, and a ceramic bushing with a mating surface configured to mate with the spherical underside of the head of the fastener. As depicted, fastener system 128 comprises fastener 130 having head 132 with spherical 134 underside 136, and ceramic bushing 138 with mating surface 140 configured to mate with the spherical 134 underside 136 of head 132 of fastener 130.

Mating surface 140 is complementary to spherical 134 underside 136 of head 132 of fastener 130. In some illustrative examples, mating surface 140 of ceramic bushing 138 may be referred to as a spherical recession or a spherical recessed surface.

In some illustrative examples, mating surface 140 is only a portion of a recessed surface of ceramic bushing 138. In some illustrative examples, mating surface 140 is the entire recessed surface of ceramic bushing 138.

Although mating surface 140 is configured to mate with spherical 134 underside 136 of head 132, in some illustrative examples, portions of spherical 134 underside 136 may not contact mating surface 140. In some illustrative examples, a surface area of mating surface 140 of ceramic bushing 138 is less than a surface area of spherical 134 underside 136 of head 132. In some illustrative examples, a surface area of mating surface 140 of ceramic bushing 138 is approximately the same as a surface area of spherical 134 underside 136 of head 132. In some illustrative examples, a surface area of mating surface 140 of ceramic bushing 138 is greater than a surface area of spherical 134 underside 136 of head 132.

In some illustrative examples, a cross-sectional circumference of mating surface 140 of ceramic bushing 138 is less than a cross-sectional circumference of spherical 134 underside 136 of head 132. In some illustrative examples, a cross-sectional circumference of mating surface 140 of ceramic bushing 138 is substantially the same as a cross-sectional circumference of spherical 134 underside 136 of head 132. In some illustrative examples, a cross-sectional circumference of mating surface 140 of ceramic bushing 138 is greater than a cross-sectional circumference of spherical 134 underside 136 of head 132.

Fastener 130 is made of any desirable type of material 142. In some illustrative examples, fastener 130 is formed of a high temperature metal, monolithic 143 ceramic 144, or a ceramic matrix composite material. In some illustrative examples of thermal protection system 102, each fastener is formed of ceramic 144.

Underside 136 of fastener 130 head 132 is spherical 134 and mates to a similarly shaped pocket, mating surface 140, in ceramic bushing 138. The design of underside 136 of fastener 130 head 132 and mating surface 140 of ceramic bushing 138 allow for semi-free movement 146 of ceramic panel 110 to occur about the attachment formed by fastener system 128. Movement 146 may be referred to as rotation about the attachment. The design of underside 136 of fastener 130 head 132 and mating surface 140 of ceramic bushing 138 allow for movement 146 of ceramic panel 110 about the attachment formed by fastener system 128 to be inhibited only by friction 148.

Ceramic bushing 138 is embedded and bonded into ceramic foam panel 116 to accept fastener 130. Ceramic bushing 138 prevents creation of inconsistencies within ceramic foam panel 115 due to fastener loads from fastener 130. Ceramic bushing 138 spreads out loads from fastener 130 in ceramic foam panel 116.

In thermal protection system 102, each fastener system further comprises a nut secured to a shaft of a respective fastener. For example, nut 150 is secured to shaft 152 of fastener 130.

Thermal protection system 102 further comprises non-structural layer 154 between each nut and ceramic panel 110. Non-structural layer 154 is one of compliant material layer 156 or gap 158. In some illustrative examples, compliant material layer 156 is strain isolation pad 160.

Non-structural layer 154 is positioned between ceramic panel 110 and structure 106. Non-structural layer 154 enables movement of ceramic panel 110 relative to structure 106. More specifically, when ceramic panel 110 bows slightly, portions of ceramic panel 110 will enter the volume of non-structural layer 154.

When non-structural layer 154 takes the form of compliant material layer 156, movement of ceramic panel 110 compresses portions of complaint material layer 156. In some illustrative examples, when ceramic panel 110 bows slightly, corners of ceramic panel 110 compress compliant material layer 156.

When non-structural layer 154 takes the form of gap 158, a spacer or bushing is used to maintain gap 158. The spacer or bushing may be positioned on shaft 152 of fastener 130 between ceramic panel 110 and structure 106. In some illustrative examples, when ceramic panel 110 bows slightly, corners of ceramic panel 110 enter gap 158.

Nut 150 is connected to shaft 152 of fastener 130 such that a distance from nut 150 to head 132 of fastener 130 is configured to allow movement within thermal protection system 102. More specifically, the distance between nut 150 and head 132 is not minimized. The distance between nut 150 and head 132 includes non-structural layer 154. Non-structural layer 154 allows for bowing of ceramic panel 110 relative to structure 106 due to thermal expansion.

Ceramic panel 110 is allowed to rotate relative to fastener 130. By allowing for rotation, coupled with the use of compliant material layer 156 on the lower side of ceramic panel 110, ceramic panel 110 is allowed to bow slightly. The bowing of ceramic panel 110 relieves the thermally induced stresses.

In some illustrative examples of thermal protection system 102, each fastener system further comprises a ceramic cover plug having an outer diameter equal to an outer diameter of the ceramic bushing. For example, fastener system 128 has ceramic cover plug 162. Ceramic cover plug 162 has outer diameter 164 equal to outer diameter 166 of ceramic bushing 138.

Figure 2:
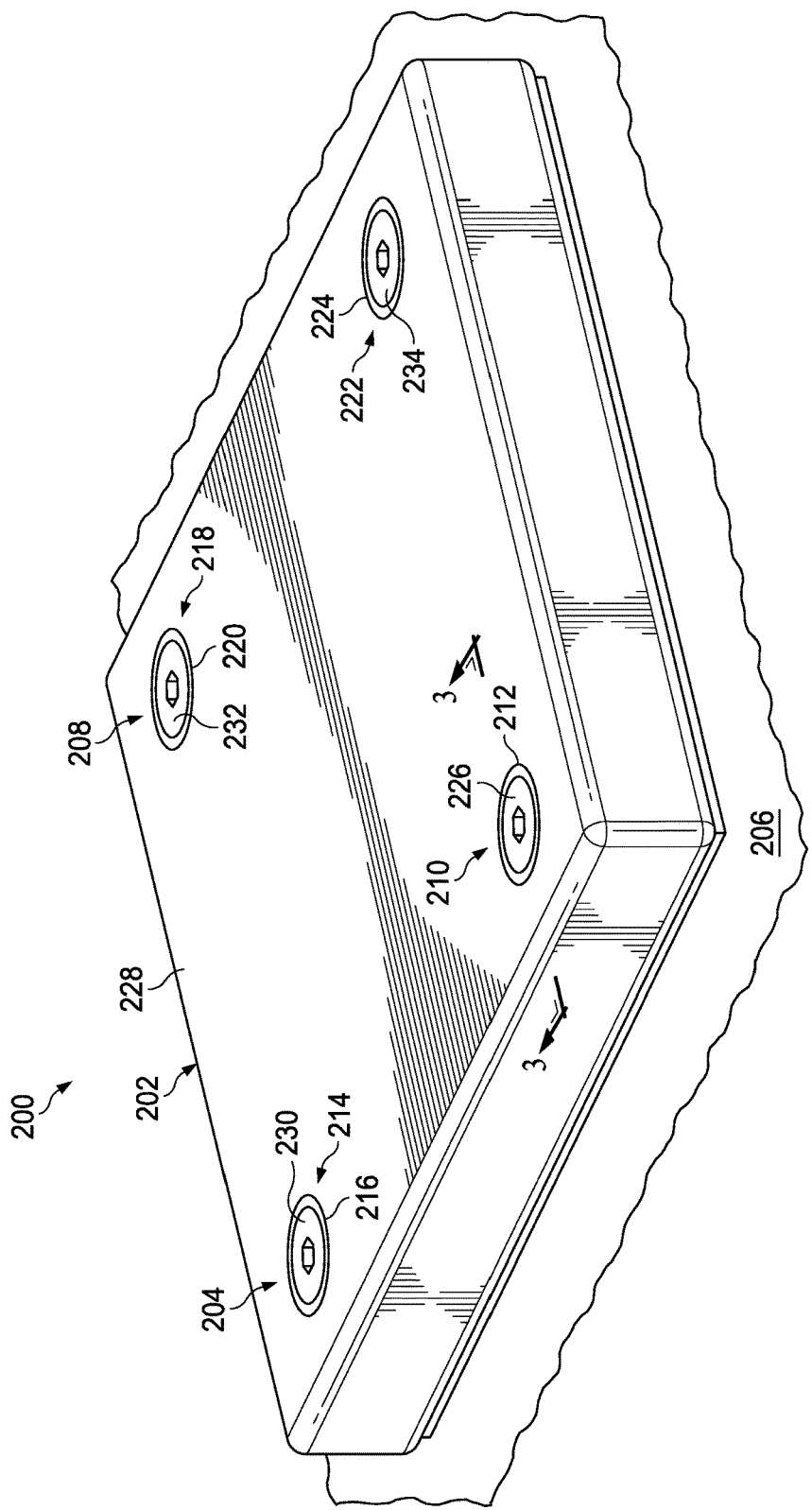
FIG. 2 is an illustration of an isometric view of a portion of a thermal protection system in accordance with an illustrative embodiment.

Turning now to FIG. 2, an illustration of an isometric view of a portion of a thermal protection system is depicted in accordance with an illustrative embodiment. Thermal protection system 200 is a physical implementation of thermal protection system 102 of FIG. 1. Thermal protection system 200 may be used in aircraft 1100 of FIG. 11 or any other desirable platform, such as platform 104 of FIG. 1.

As depicted, ceramic panel 202 has plurality of attachment points 204 to structure 206. Plurality of apertures 208 extend through ceramic panel 202. Each aperture of plurality of apertures 208 is located at an attachment point of attachment points 204.

A fastener system is within each of plurality of apertures 208. For example, fastener system 210 is within aperture 212. Fastener system 214 is within aperture 216. Fastener system 218 is within aperture 220. Fastener system 222 is within aperture 224.

In this illustrative example, fastener 226 of fastener system 210 is substantially flush with surface 228 of ceramic panel 202. Fastener 230 of fastener system 214 is substantially flush with surface 228 of ceramic panel 202. Fastener 232 of fastener system 218 is substantially flush with surface 228 of ceramic panel 202. Fastener 234 of fastener system 222 is substantially flush with surface 228 of ceramic panel 202.

Figure 3:
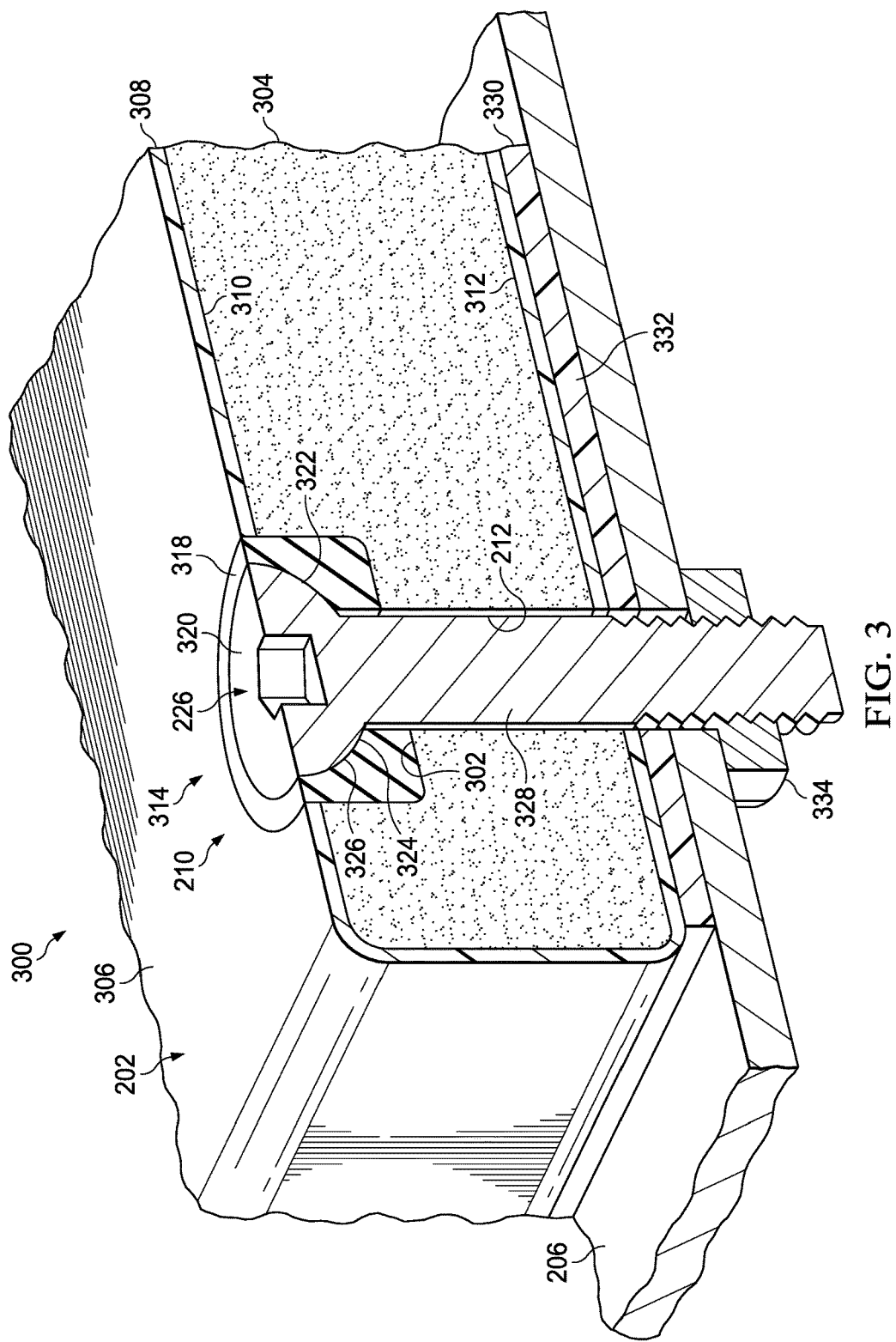
FIG. 3 is an illustration of a cross-sectional isometric view of a fastener system in a thermal protection system in accordance with an illustrative embodiment.

Turning now to FIG. 3, an illustration of a cross-sectional isometric view of a fastener system in a thermal protection system in accordance with an illustrative embodiment. View 300 is a cross-sectional view through fastener system 210 of FIG. 2.

As depicted, aperture 212 has counterbore 302. Counterbore 302 extends through only a portion of ceramic foam panel 304 of ceramic panel 202.

Ceramic panel 202 comprises number of ceramic matrix composite facesheets 306 and ceramic foam panel 304. In this illustrative example, number of ceramic matrix composite facesheets 306 comprises ceramic matrix composite facesheet 308.

As depicted, ceramic matrix composite facesheet 308 is wrapped around ceramic foam panel 304 to form ceramic panel 202. As depicted, ceramic matrix composite facesheet 308 contacts first face 310 of ceramic foam panel 304 and second face 312 of ceramic foam panel 304. In some non-illustrated examples, number of ceramic matrix composite facesheets 306 may comprise more than one facesheet, with a second ceramic matrix composite facesheet (not depicted) contacting second face 312 of ceramic foam panel 304.

Fastener system 210 connects ceramic panel 202 to structure 206. Fastener system 210 and aperture 212 form attachment point 314 of plurality of attachment points 204.

Fastener system 210 comprises fastener 226 and ceramic bushing 318. Fastener 226 has head 320 with spherical 322 underside 324. Ceramic bushing 318 has mating surface 326 configured to mate with spherical 322 underside 324 of head 320 of fastener 226.

As depicted, a surface area of mating surface 326 of ceramic bushing 318 is slightly smaller than a surface area of spherical 322 underside 324 of head 320. As depicted, there is a gap between aperture 212 and shaft 328 of fastener 226. The gap between aperture 212 and shaft 328 of fastener 226 allows for rotation of ceramic panel 202. The surface area of mating surface 326 is only slightly smaller to enable rotation of ceramic panel 202. As depicted, a cross-sectional circumference of mating surface 326 of ceramic bushing 318 is substantially the same as a cross-sectional circumference of spherical 322 underside 324 of head 320. As depicted, mating surface 326 of ceramic bushing 318 is the entirety of the recessed surface of ceramic bushing 318.

Ceramic bushing 318 is inserted into counterbore 302 of aperture 212. Ceramic bushing 318 is embedded and bonding into ceramic foam panel 304. Ceramic bushing 318 spreads the loads from fastener 226 into ceramic foam panel 304. Ceramic bushing 318 creates an interface for movement of ceramic panel 202. Ceramic bushing 318 creates a relatively smooth interface for movement of ceramic panel 202 with relatively low friction. Ceramic bushing 318 creates an interface for movement of ceramic panel 202 with an amount of friction configured such that internal forces created by panel deflections are able to overcome frictional forces without imparting an undesirable amount of stress in the ceramic materials. Ceramic bushing 318 is formed of any desirable monolithic ceramic material. In some illustrative examples, ceramic bushing 318 is made of a fused silica material.

Underside 324 of fastener 226 head 320 would mate to mating surface 326, which is a similarly spherical shaped pocket in ceramic bushing 318. The shapes of mating surface 326 and spherical 322 underside 324 allow for semi-free rotation to occur about attachment point 314. The movement of ceramic panel 202 relative to fastener 226 is enabled by the interaction of mating surface 326 and spherical 322 underside 324 of fastener 226. The movement of ceramic bushing 318 relative to fastener 226 is inhibited by friction. The movement of ceramic panel 202 relative to fastener 226 due to thermal expansion is inhibited by friction of underside 324 and mating surface 326.

Fastener 226 also has shaft 328. Fastener 226 is formed of any desirable material. In some illustrative examples, fastener 226 is formed of a monolithic ceramic material.

Shaft 328 of fastener 226 extends through aperture 212. Clearance between shaft 328 and aperture 212 allows for rotation of ceramic panel 202. Shaft 328 extends through non-structural layer 330 and structure 206. In this illustrative example, non-structural layer 330 is compliant material layer 332. In some illustrative examples, compliant material layer 332 may be a strain isolation pad. Although not depicted, in some other illustrative examples, non-structural layer 330 may take the form of a gap between ceramic panel 202 and structure 206. When non-structural layer 330 takes the form of a gap, a spacer or bushing is used to maintain the gap after installation of fastener 226. Non-structural layer 330 allows for bowing of ceramic panel 202 relative to structure 206 due to thermal expansion.

Ceramic panel 202 is allowed to rotate relative to fastener 226. By allowing for rotation, coupled with the use of compliant material layer 332 on the lower side of ceramic panel 202, ceramic panel 202 is allowed to bow slightly. The bowing of ceramic panel 202 relieves the thermally induced stresses. As depicted, compliant material layer 332 would be bonded to ceramic panel 202 with a non-structural ceramic adhesive (not depicted) that has sufficient strength to hold compliant material layer 332 in place. The non-structural ceramic adhesive is not suitable for structural attachment to ceramic panel 202 in high temperature situations.

Nut 334 connects to shaft 328 to secure fastener system 210 within aperture 212. Nut 334 is formed of any desirable material. In some illustrative examples, nut 334 is formed of a monolithic ceramic material.

The illustration of fastener system 210 is only one non-limiting depiction of a physical implementation of fastener system 128 of FIG. 1. View 300 of fastener system 210 is not meant to imply architectural limitations as to the manner in which different illustrative embodiments may be implemented. In some illustrative examples, counterbore 302 may extend through ceramic foam panel 304 so that ceramic bushing 318 contacts the lower portion of ceramic matrix composite facesheet 308.

Figure 4:
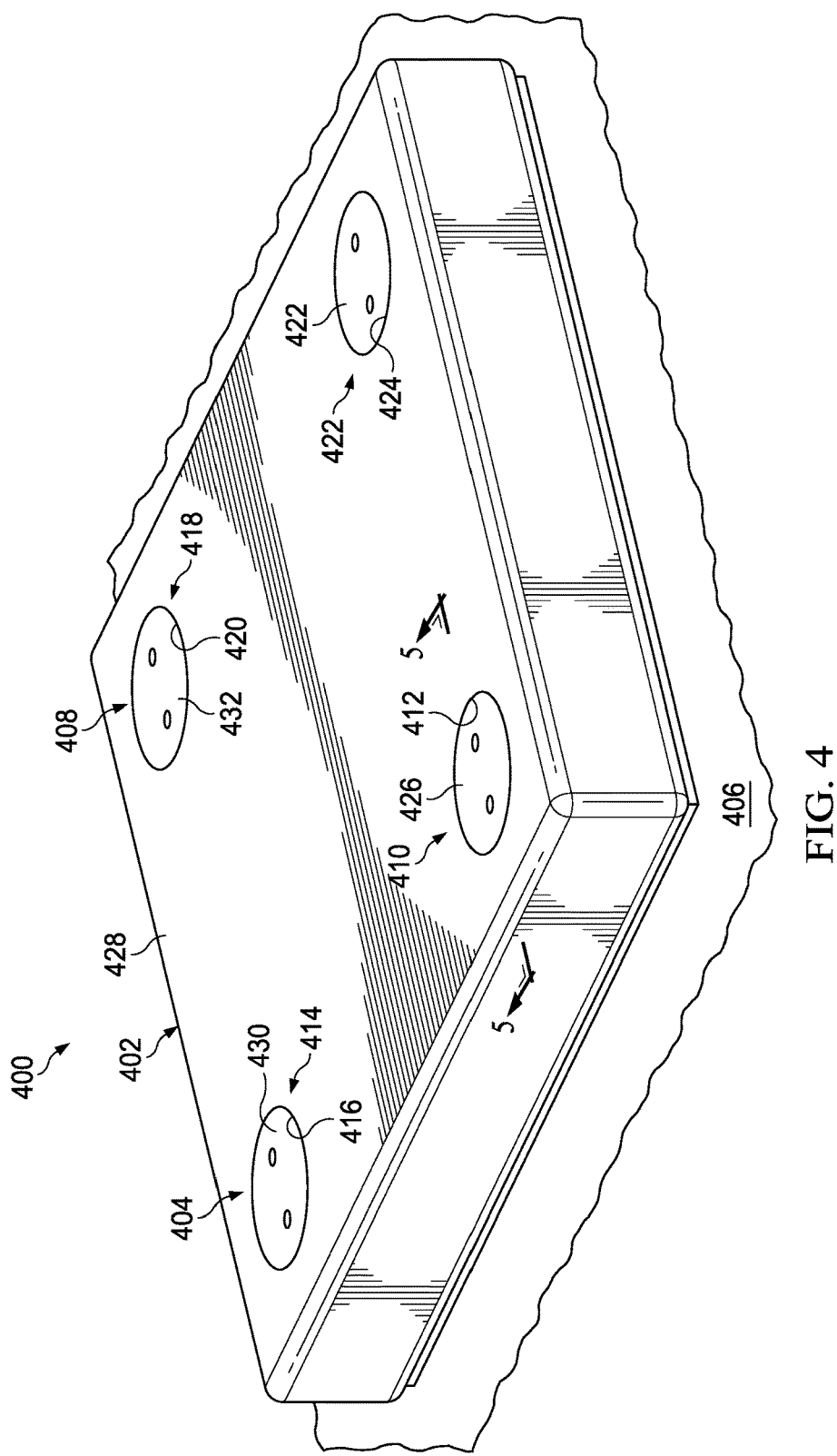
FIG. 4 is an illustration of an isometric view of a portion of a thermal protection system in accordance with an illustrative embodiment.

Turning now to FIG. 4, an illustration of an isometric view of a portion of a thermal protection system is depicted in accordance with an illustrative embodiment. Thermal protection system 400 is a physical implementation of thermal protection system 102 of FIG. 1. Thermal protection system 400 may be used in aircraft 1100 of FIG. 11 or any other desirable platform, such as platform 104 of FIG. 1.

As depicted, ceramic panel 402 has plurality of attachment points 404 to structure 406. Plurality of apertures 408 extend through ceramic panel 402. Each aperture of plurality of apertures 408 is located at an attachment point of attachment points 404.

A fastener system is within each of plurality of apertures 408. For example, fastener system 410 is within aperture 412. Fastener system 414 is within aperture 416. Fastener system 418 is within aperture 420. Fastener system 422 is within aperture 424.

In this illustrative example, ceramic cover plug 426 of fastener system 410 is substantially flush with surface 428 of ceramic panel 402. Ceramic cover plug 430 of fastener system 414 is substantially flush with surface 428 of ceramic panel 402. Ceramic cover plug 432 of fastener system 418 is substantially flush with surface 428 of ceramic panel 402. Ceramic cover plug 434 of fastener system 422 is substantially flush with surface 428 of ceramic panel 402.

Figure 5:
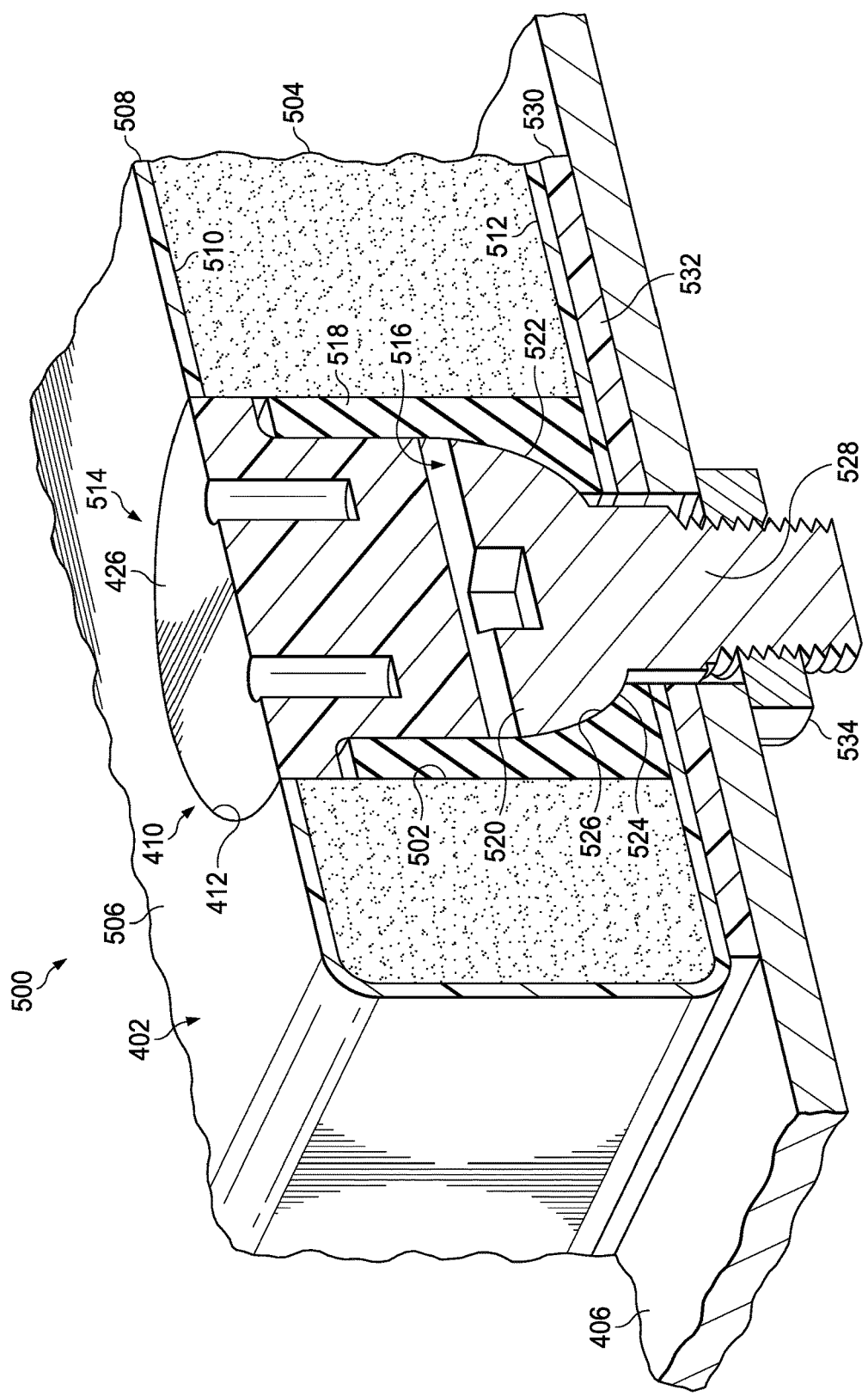
FIG. 5 is an illustration of a cross-sectional isometric view of a fastener system in a thermal protection system in accordance with an illustrative embodiment.

Turning now to FIG. 5, an illustration of a cross-sectional isometric view of a fastener system in a thermal protection system is depicted in accordance with an illustrative embodiment. View 500 is a cross-sectional view through fastener system 410 of FIG. 4.

As depicted, aperture 412 has counterbore 502. Counterbore 502 extends through only a portion of ceramic foam panel 504 of ceramic panel 402.

Ceramic panel 402 comprises number of ceramic matrix composite facesheets 506 and ceramic foam panel 504. In this illustrative example, number of ceramic matrix composite facesheets 506 comprises ceramic matrix composite facesheet 508.

As depicted, ceramic matrix composite facesheet 508 is wrapped around ceramic foam panel 504 to form ceramic panel 402. As depicted, ceramic matrix composite facesheet 508 contacts first face 510 of ceramic foam panel 504 and second face 512 of ceramic foam panel 504. In some non-illustrated examples, number of ceramic matrix composite facesheets 506 may comprise more than one facesheet, with a second ceramic matrix composite facesheet (not depicted) contacting second face 512 of ceramic foam panel 504.

Fastener system 410 connects ceramic panel 402 to structure 406. Fastener system 410 and aperture 412 form attachment point 514 of plurality of attachment points 404.

Fastener system 410 comprises fastener 516 and ceramic bushing 518. Fastener 516 has head 520 with spherical 522 underside 524. Ceramic bushing 518 has mating surface 526 configured to mate with spherical 522 underside 524 of head 520 of fastener 516.

In this illustrative example, faster 516 is buried to eliminate surface proximity. By burying head 520 fastener 516 within ceramic foam panel 504, bending stress on fastener 516 is reduced.

Ceramic bushing 518 is inserted into counterbore 502 of aperture 412. Ceramic bushing 518 is embedded and bonding into ceramic foam panel 504. Ceramic bushing 518 spreads the loads from fastener 516 into ceramic foam panel 504. Ceramic bushing 518 is formed of any desirable monolithic ceramic material. In some illustrative examples, ceramic bushing 518 is made of a fused silica material.

Underside 524 of fastener 516 head 520 mates to mating surface 526, which is a similarly spherical shaped pocket in ceramic bushing 518. As depicted, a surface area of mating surface 526 of ceramic bushing 518 is slightly smaller than a surface area of spherical 522 underside 524 of head 520. As depicted, there is a gap between aperture 412 and shaft 528 of fastener 516. The gap between aperture 412 and shaft 528 of fastener 516 allows for rotation of ceramic panel 402. The surface area of mating surface 526 is only slightly smaller to enable rotation of ceramic panel 402. As depicted, a cross-sectional circumference of mating surface 526 of ceramic bushing 518 is substantially the same as a cross-sectional circumference of spherical 522 underside 524 of head 520. As depicted, mating surface 526 of ceramic bushing 518 is only a portion of the recessed surface of ceramic bushing 518. As depicted, the recessed surface extends towards first face 510 of ceramic foam panel 504. As depicted, the recessed surface of ceramic bushing 518 also contacts ceramic cover plug 426.

The shapes of mating surface 526 and spherical 522 underside 524 allow for semi-free rotation to occur about attachment point 514. The movement of ceramic panel 402 relative to fastener 516 is enabled by the interaction of mating surface 526 and spherical 522 underside 524 of fastener 516. The movement of ceramic bushing 518 relative to fastener 516 is inhibited by friction. The movement of ceramic panel 402 relative to fastener 516 due to thermal expansion is inhibited by friction of underside 524 and mating surface 526.

Fastener 516 also has shaft 528. Fastener 516 is formed of any desirable material. In some illustrative examples, fastener 516 is formed of a monolithic ceramic material.

Shaft 528 of fastener 516 extends through aperture 412. Shaft 528 extends through non-structural layer 530 and structure 406. In this illustrative example, non-structural layer 530 is compliant material layer 532. In some illustrative examples, compliant material layer 532 may be a strain isolation pad. Although not depicted, in some other illustrative examples, non-structural layer 530 may take the form of a gap between ceramic panel 402 and structure 406. When non-structural layer 530 takes the form of a gap, a spacer or bushing is used to maintain the gap after installation of fastener 516. Non-structural layer 530 allows for bowing of ceramic panel 402 relative to structure 406 due to thermal expansion.

Ceramic panel 402 is allowed to rotate relative to fastener 516. By allowing for rotation, coupled with the use of compliant material layer 532 on the lower side of ceramic panel 402, ceramic panel 402 is allowed to bow slightly. The bowing of ceramic panel 402 relieves the thermally induced stresses. As depicted, compliant material layer 532 would be bonded to ceramic panel 402 with a non-structural ceramic adhesive (not depicted) that has sufficient strength to hold compliant material layer 532 in place. The non-structural ceramic adhesive is not suitable for structural attachment to ceramic panel 402 in high temperature situations.

Nut 534 connects to shaft 528 to secure fastener system 410 within aperture 412. Nut 534 is formed of any desirable material. In some illustrative examples, nut 534 is formed of a monolithic ceramic material.

Fastener system 410 also comprises ceramic cover plug 426 of FIG. 4. Ceramic cover plug 426 is bonded to ceramic foam panel 504.

The illustration of fastener system 410 is only one non-limiting depiction of a physical implementation of fastener system 128 of FIG. 1. View 500 of fastener system 410 is not meant to imply architectural limitations as to the manner in which different illustrative embodiments may be implemented. In some illustrative examples, counterbore 502 may extend through second face 512 and the lower portion of ceramic matrix composite facesheet 508.

Figure 6:
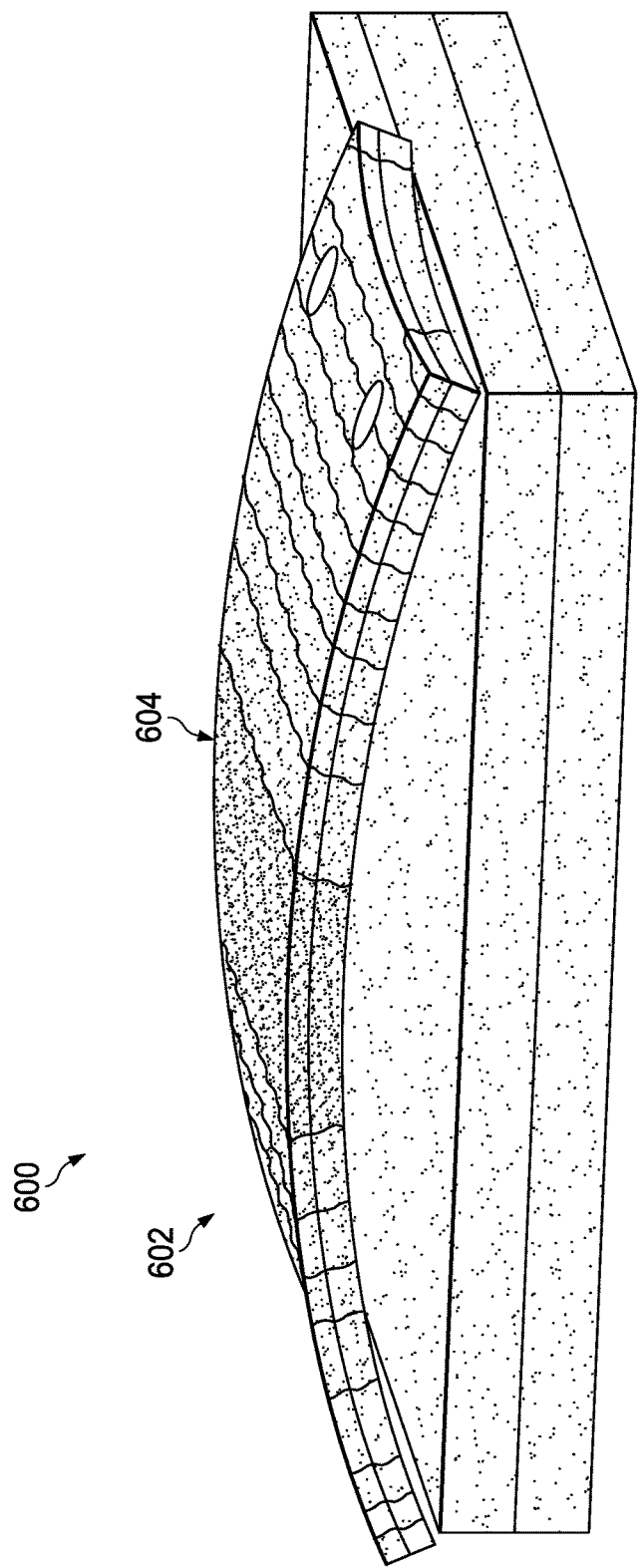
FIG. 6 is an illustration of an isometric view of a model of thermal expansion of a thermal protection system in accordance with an illustrative embodiment.

Turning now to FIG. 6, an illustration of an isometric view of a model of thermal expansion of a thermal protection system is depicted in accordance with an illustrative embodiment. View 600 is an isometric view of model 602 of thermal protection system 102 of FIG. 1.

In view 600, ceramic panel 604 is bowed outward towards a high temperature environment. Ceramic panel 604 is bowed away from structure 606. View 600 is a view of ceramic panel 604 constrained at four corner fastener systems with rotation allowed. Ceramic panel 604 is constrained at its four corners by embodiments of fastener system 128 of FIG. 1.

As depicted, ceramic panel 604 with allowed rotation has an increased deflection over a ceramic panel with rotation restrained. Using a fastener system that allows rotation, such as fastener system 128 of FIG. 1, may increase deflection by approximately 1.5 to 2 times. In one illustrative example, deflection without rotation is about 0.13 inches, while deflection with rotation is about 0.20 inches. The size of ceramic panel 604, attachment locations, and materials selected can be tailored to meet particular strength and deflection requirements.

Figure 7:
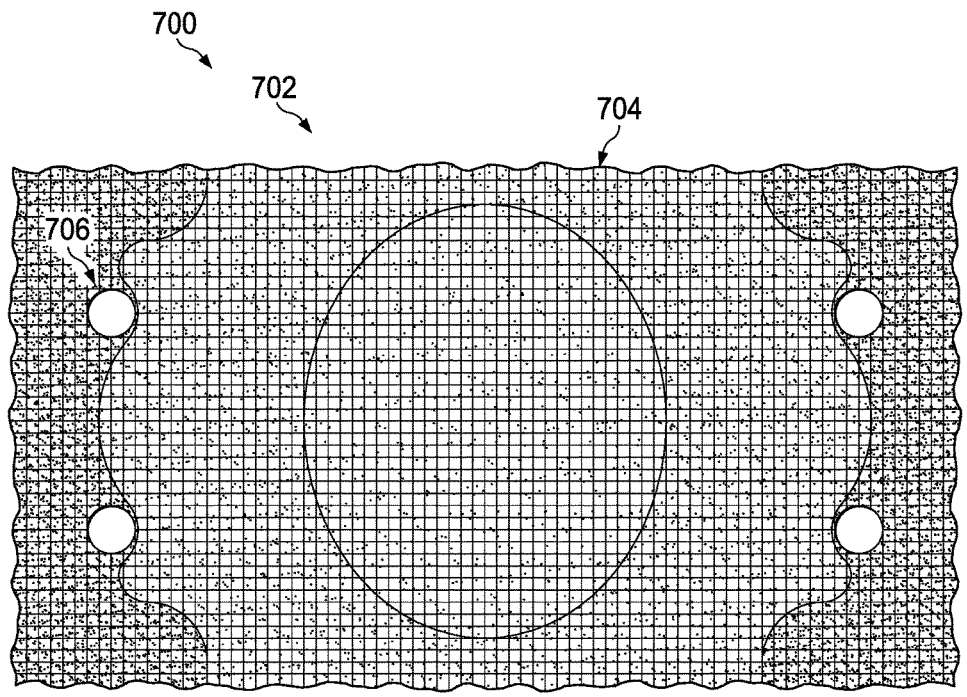
FIG. 7 is an illustration of a top view of a stress model of a thermal protection system in accordance with an illustrative embodiment.

Turning now to FIG. 7, an illustration of a top view of a stress model of a thermal protection system is depicted in accordance with an illustrative embodiment. View 700 is an isometric view of model 702 of thermal protection system 102 of FIG. 1.

View 700 depicts a significant stress reduction achieved by allowing rotation of ceramic panel 704 of model 702. As depicted, ceramic panel 704 with allowed rotation has a reduced stress over a ceramic panel with rotation restrained. Using a fastener system that allows rotation, such as fastener system 128 of FIG. 1, may reduce stress to approximately one third of a stress on a ceramic panel with rotation restrained.

Fastener systems are positioned at attachment points 706. As depicted, fastener systems at attachment points 706 distribute loads throughout ceramic panel 704. Stress is distributed into the center of ceramic panel 704 rather than being concentrated at attachment points 706.

In one illustrative example, maximum stress in a ceramic matrix composite of a ceramic panel restrained against rotation is approximately 37 ksi, while maximum stress in a ceramic matrix composite of ceramic panel 704 is approximately 12 ksi. The reduction in stress results from the use of fastener systems, such as fastener system 128 of FIG. 1 that allow rotation of ceramic panel 704. When rotation is allowed, compressive stress in panel is relieved. In this illustrative example, for model 702, the strength of the material of ceramic matrix composite facesheet of ceramic panel 704 is about 10-15 ksi.

Figure 8:
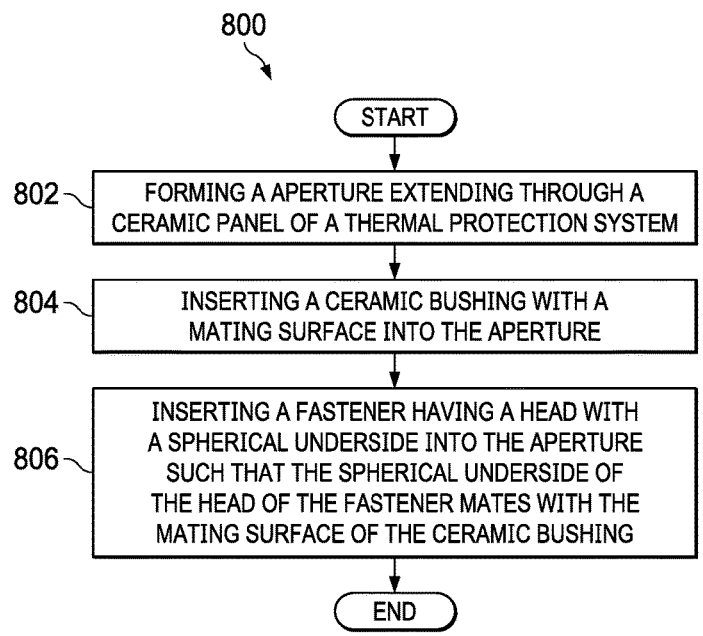
FIG. 8 is an illustration of a flowchart of a method for forming a fastener system in a thermal protection system in accordance with an illustrative embodiment.

Turning now to FIG. 8, an illustration of a flowchart of a method for forming a fastener system in a thermal protection system is depicted in accordance with an illustrative embodiment. Method 800 may be used to form fastener system 128 of FIG. 1. Method 800 may be used to form any of fastener system 210, fastener system 214, fastener system 218, or fastener system 222 or FIGS. 2 and 3. Method 800 may be used to form any of fastener system 410, fastener system 414, fastener system 418, or fastener system 422 or FIGS. 4 and 5.

Method 800 forms an aperture extending through a ceramic panel of a thermal protection system (operation 802). Method 800 inserts a ceramic bushing with a mating surface into the aperture (operation 804). Method 800 inserts a fastener having a head with a spherical underside into the aperture such that the spherical underside of the head of the fastener mates with the mating surface of the ceramic bushing (operation 806). Afterwards the method terminates.

Figure 9:
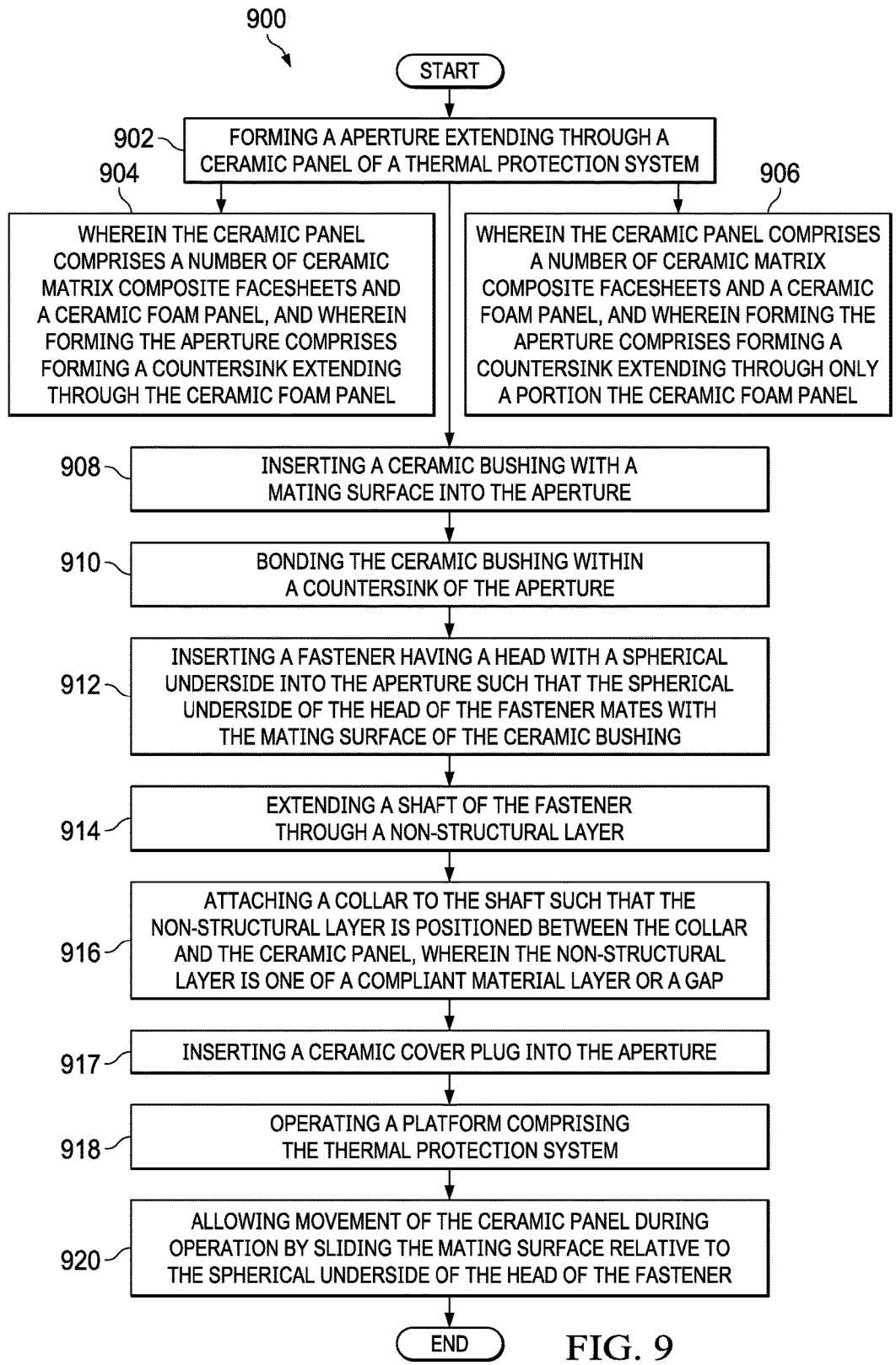
FIG. 9 is an illustration of a flowchart of a method for forming and using a fastener system in a thermal protection system in accordance with an illustrative embodiment.

Turning now to FIG. 9, an illustration of a flowchart of a method for forming and using a fastener system in a thermal protection system is depicted in accordance with an illustrative embodiment. Method 900 may be used to form fastener system 128 of FIG. 1. Method 900 may be used to form any of fastener system 210, fastener system 214, fastener system 218, or fastener system 222 or FIGS. 2 and 3. Method 900 may be used to form any of fastener system 410, fastener system 414, fastener system 418, or fastener system 422 or FIGS. 4 and 5.

Method 900 forms an aperture extending through a ceramic panel of a thermal protection system (operation 902). In some illustrative examples, the ceramic panel comprises a number of ceramic matrix composite facesheets and a ceramic foam panel, and forming the aperture comprises forming a counterbore extending through the ceramic foam panel (operation 904). In some illustrative examples, the ceramic panel comprises a number of ceramic matrix composite facesheets and a ceramic foam panel, and forming the aperture comprises forming a counterbore extending through only a portion the ceramic foam panel (operation 906).

Method 900 inserts a ceramic bushing with a mating surface into the aperture (operation 908). Method 900 bonds the ceramic bushing within a counterbore of the aperture (operation 910). Method 900 inserts a fastener having a head with a spherical underside into the aperture such that the spherical underside of the head of the fastener mates with the mating surface of the ceramic bushing (operation 912).

Method 900 extends a shaft of the fastener through a non-structural layer (operation 914). Method 900 attaches a nut to the shaft such that the non-structural layer is positioned between the nut and the ceramic panel, wherein the non-structural layer is one of a compliant material layer or a gap (operation 916). Method 900 inserts a ceramic cover plug into the aperture (operation 917).

Method 900 operates a platform comprising the thermal protection system (operation 918). Method 900 allows movement of the ceramic panel during operation by sliding the mating surface relative to the spherical underside of the head of the fastener (operation 920). Afterwards the method terminates.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 900 are implemented. For example, operations 904 and 906 are alternative operations. When operation 904 is performed, operation 906 is not performed. As another example, operation 917 is optional in some illustrative examples. When operation 906 is performed, operation 917 may not be performed. For example, when operation 906 is performed, the counterbore extends through only a portion of the ceramic foam panel and a ceramic cover plug may not be used. For example, when operation 906 is performed, the fastener may be substantially flush with the ceramic panel.

Figure 10:
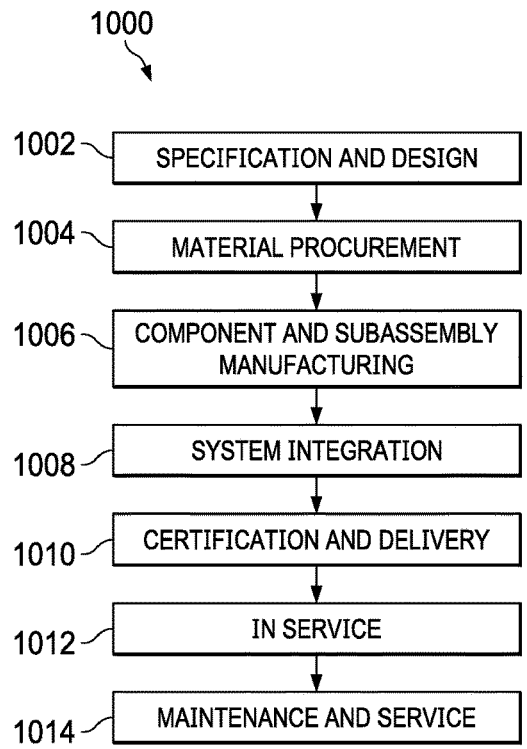
FIG. 10 is an illustration of an aircraft manufacturing and service method in the form of a block diagram in accordance with an illustrative embodiment.
Figure 11:
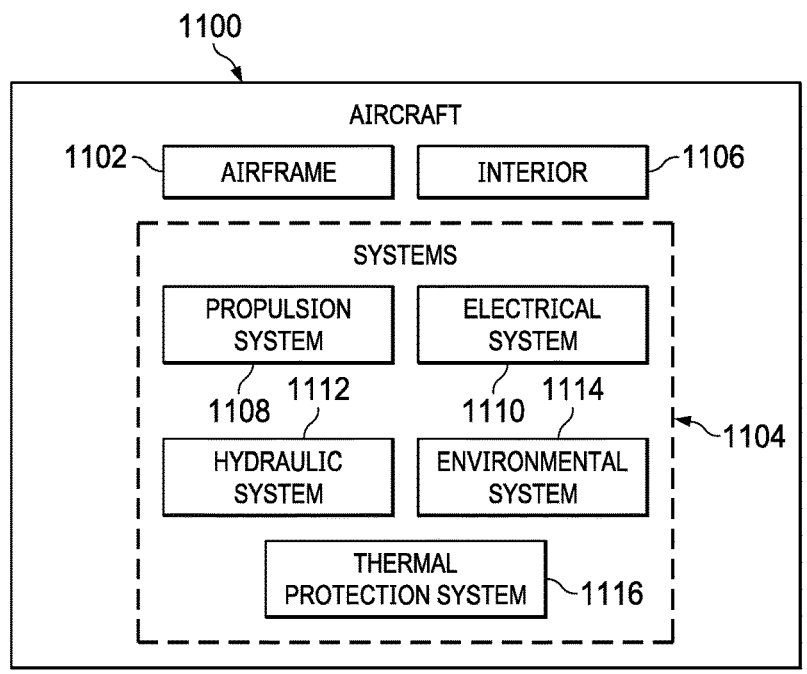
FIG. 11 is an illustration of an aircraft in the form of a block diagram in which an illustrative embodiment may be implemented.

Illustrative embodiments of the present disclosure may be described in the context of aircraft manufacturing and service method 1000 as shown in FIG. 10 and aircraft 1100 as shown in FIG. 11. Turning first to FIG. 10, a diagram illustrating an aircraft manufacturing and service method is depicted in accordance with an advantageous embodiment. During pre-production, exemplary aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 may go through certification and delivery 1010 in order to be placed in service 1012. While in service by a customer, aircraft 1100 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be a company, a military entity, a service organization, and so on.

With reference now to FIG. 11, a diagram of an aircraft is depicted in which an advantageous embodiment may be implemented. In this illustrative example, aircraft 1100 is produced by aircraft manufacturing and service method 1000 in FIG. 10. Aircraft 1100 may include airframe 1102 with a plurality of systems 1104 and interior 1106.

Examples of plurality of systems 1104 include one or more of propulsion system 1108, electrical system 1110, hydraulic system 1112, environmental system 1114, and thermal protection system 1116. At least some of the different advantageous embodiments may provide a method and apparatus for attaching thermal protection elements within thermal protection system 1116 to aircraft 1100. Although an aerospace example is shown, different advantageous embodiments may be applied to other industries, such as the automotive industry.

One or more of the different advantageous embodiments recognize and take into account that it is desirable to have a mechanical system for attaching tiles for a thermal protection system to a vehicle structure that may have less weight. The different advantageous embodiments also take into account and recognize that it may be desirable to have a mechanical attachment system that may allow for quicker attachment and replacement of tiles.

A mechanically fastened ceramic thermal protection system (TPS) using spherical head fasteners with outer mold line (OML) access is provided to reduce stress in the thermal protection system (TPS) and allow for easy installation and removal. The fasteners are oriented such that they go through the thickness of the ceramic tile, and have fastener heads with spherical shape on the mating surface to the thermal protection system (TPS). This allows for semi-free rotation (barring friction losses) about the attachment points, significantly relieving stresses in the thermal protection system (TPS) material.

The fastener systems of the illustrative examples provide a through thickness, OML access fastener with a semi-spherical head to attach ceramic thermal protection tiles to a vehicles structure. The illustrative examples solve challenges related to backside temperatures that are too high for adhesive bonding. The illustrative examples may be utilized in an afterburning engine exhaust deck, spacecraft, or other desirable platforms. The illustrative examples may be utilized in any vehicles or platforms where backside temperatures are over 550° F. or mechanical attachment is desired for cost or maintainability reasons.

One of the technical challenges of making a mechanically attached thermal protection system (TPS) system is the management of thermal growth. As the thermal protection system (TPS) material heats up, it grows, putting stress at the attachment locations. The hot-side surface of the TPS will grow more than the underside, causing the panel to want to bow outward. Restraining this thermal growth puts significant stresses into the thermal protection system (TPS). By allowing for rotation, coupled with the use of a non-structural layer, such as a strain isolation material, on the lower side of the tile, the thermal protection system (TPS) panel is allowed to bow slightly, relieving the thermally induced stresses. In some alternatives, instead of a compliant strain isolation material (SIP) layer, a gap could be left between the tile and the structure to allow bowing. In these illustrative examples, the non-structural layer takes the form of the gap.

The amount of deflection in a thermal protection system is dependent on materials, tile size, and temperature. In some illustrative examples, the amount of deflection is about 0.1 inch.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A thermal protection system comprising:
a ceramic panel having a plurality of attachment points to a structure, wherein the ceramic panel comprises a number of ceramic matrix composite facesheets and a ceramic foam panel;
a plurality of apertures extending through the ceramic panel, each aperture of the plurality of apertures located at an attachment point of the plurality of attachment points; and
a fastener system within each of the plurality of apertures, wherein each fastener system comprises:
a fastener having a head with a spherical underside; and
a ceramic bushing with a mating surface configured to mate with the spherical underside of the head of the fastener.

2. The thermal protection system of claim 1, wherein the number of ceramic matrix composite facesheets comprises a ceramic matrix composite facesheet contacting a first face of the ceramic foam panel.

3. The thermal protection system of claim 2, wherein the number of ceramic matrix composite facesheets further comprises a second ceramic matrix composite facesheet contacting a second face of the ceramic foam panel, wherein the second face is opposite the first face.

4. The thermal protection system of claim 1, wherein the number of ceramic matrix composite facesheets comprises a ceramic matrix composite facesheet wrapped around the ceramic foam panel.

5. The thermal protection system of claim 1, wherein each aperture of the plurality of apertures comprises a counterbore, and wherein each ceramic bushing is within a respective counterbore.

6. The thermal protection system of claim 5, wherein each counterbore extends through the ceramic foam panel.

7. The thermal protection system of claim 5, wherein each counterbore extends through only a portion the ceramic foam panel.

8. The thermal protection system of claim 1, wherein each fastener system further comprises a ceramic cover plug having an outer diameter equal to an outer diameter of the ceramic bushing.

9. The thermal protection system of claim 1, wherein each fastener is formed of a ceramic material.

10. A thermal protection system comprising:
a ceramic panel having a plurality of attachment points to a structure;
a plurality of apertures extending through the ceramic panel, each aperture of the plurality of apertures located at an attachment point of the plurality of attachment points; and
a fastener system within each of the plurality of apertures, wherein each fastener system comprises:
a fastener having a head with a spherical underside; and
a ceramic bushing with a mating surface configured to mate with the spherical underside of the head of the fastener;
wherein each fastener system further comprises a nut secured to a shaft of a respective fastener, and further comprising:
a non-structural layer between each nut and the ceramic panel, wherein the non-structural layer is one of a compliant material layer or a gap.

11. A method comprising:
forming an aperture extending through a ceramic panel of a thermal protection system, wherein the ceramic panel comprises a ceramic matrix composite facesheet wrapped around a ceramic foam panel, and wherein forming the aperture comprises forming a counterbore extending through the ceramic foam panel;
inserting a ceramic bushing with a mating surface into the aperture; and
inserting a fastener having a head with a spherical underside into the aperture such that the spherical underside of the head of the fastener mates with the mating surface of the ceramic bushing.

12. The method of claim 11 further comprising:
bonding the ceramic bushing within the counterbore of the aperture.

13. The method of claim 11, further comprising:
operating a platform comprising the thermal protection system; and
allowing movement of the ceramic panel during operation by sliding the mating surface relative to the spherical underside of the head of the fastener.

14. The method of claim 11, further comprising:
inserting a ceramic cover plug into the aperture.

15. A method comprising:
forming an aperture extending through a ceramic panel of a thermal protection system, wherein the ceramic panel comprises a ceramic matrix composite facesheet wrapped around a ceramic foam panel, and wherein forming the aperture comprises forming a counterbore extending through only a portion the ceramic foam panel;
inserting a ceramic bushing with a mating surface into the aperture; and
inserting a fastener having a head with a spherical underside into the aperture such that the spherical underside of the head of the fastener mates with the mating surface of the ceramic bushing.

16. The method of claim 15 further comprising:
bonding the ceramic bushing within the counterbore of the aperture.

17. The method of claim 15, further comprising:
operating a platform comprising the thermal protection system; and
allowing movement of the ceramic panel during operation by sliding the mating surface relative to the spherical underside of the head of the fastener.

18. The method of claim 15, further comprising:
inserting a ceramic cover plug into the aperture.

19. A method comprising:
forming an aperture extending through a ceramic panel of a thermal protection system;
inserting a ceramic bushing with a mating surface into the aperture;
inserting a fastener having a head with a spherical underside into the aperture such that the spherical underside of the head of the fastener mates with the mating surface of the ceramic bushing;
extending a shaft of the fastener through a non-structural layer; and
attaching a nut to the shaft such that the non-structural layer is positioned between the nut and the ceramic panel, wherein the non-structural layer is one of a compliant material layer or a gap.

20. The method of claim 19 further comprising:
bonding the ceramic bushing within a counterbore of the aperture.

21. The method of claim 19, further comprising:
operating a platform comprising the thermal protection system; and
allowing movement of the ceramic panel during operation by sliding the mating surface relative to the spherical underside of the head of the fastener.

22. The method of claim 19, further comprising:
inserting a ceramic cover plug into the aperture.

* * * * *